United States Patent [19]
Nakajima

[11] Patent Number: 5,461,483
[45] Date of Patent: Oct. 24, 1995

[54] OPTICAL CARD HAVING REGISTERED REGION FOR DIRECTORY MODIFIED INFORMATION AND FILE MANAGEMENT METHOD FOR OPTICAL CARD

[75] Inventor: Yoshio Nakajima, Higashimurayama, Japan

[73] Assignee: Olympus Optical Co., Ltd., Tokyo, Japan

[21] Appl. No.: 51,203

[22] Filed: Apr. 22, 1993

Related U.S. Application Data

[62] Division of Ser. No. 792,556, Nov. 15, 1991.

[30] Foreign Application Priority Data

Nov. 16, 1990 [JP] Japan ................................. 2-311153

[51] Int. Cl.⁶ ........................................................ H04N 1/21
[52] U.S. Cl. ................................................................ 358/296
[58] Field of Search ................................ 346/108, 76 L, 346/160; 358/296, 298, 306, 302; 235/454, 456

[56] References Cited

U.S. PATENT DOCUMENTS

| | | |
|---|---|---|
| 4,910,725 | 3/1990 | Drexler et al. |
| 4,931,628 | 6/1990 | Wada ............................. 235/454 |

*Primary Examiner*—Mark J. Reinhart
*Attorney, Agent, or Firm*—Armstrong, Westerman, Hattori, McLeland & Naughton

[57] ABSTRACT

For an optical card in which write-once-information can be optically recorded as a file, an optical card provided with a registered region of directory information including a file name discriminating a file and a file size, a registered region of directory modified information for enabling to delete and modify the directory information, such as renaming is disclosed. Also, a management method of an optical card file in which the directory information can be deleted and modified, such as renamed by the directory modified information is disclosed.

9 Claims, 5 Drawing Sheets

| FILE NAME | EXTENSION | FILE SIZE | TRACK AND SECTOR INFORMATION |
|---|---|---|---|

FIG.5

| SUBJECT FILE NAME | SUBJECT FILE REGISTERED ORDER | CHANGED ATTRIBUTE INFORMATION |
|---|---|---|
| 12 | 13 | 14 |

| 00 | | 07 | 08 | | 0A | 0B | 0C | | 0F |
|---|---|---|---|---|---|---|---|---|---|
| FILE NAME | | | EXTENSION | | | ATTRIBUTE | RESERVE | | |

| 10 | | 15 | 16 | 17 | 18 | 19 | 1A | 1B | 1C | | 1F |
|---|---|---|---|---|---|---|---|---|---|---|---|
| AREA | | | CHANGED TIME | | CHANGED DATE | | CLUSTER NUMBER | | | FILE SIZE | |

FIG.9

| 00 | | 07 | 08 | | 0A | 0B | 0C | 0D | 0E | 0F |
|---|---|---|---|---|---|---|---|---|---|---|
| FILE NAME | | | $ $ 0 | | | FILE NUMBER | | THE OTHER CHANGE | | |

ATTRIBUTE (0C–0F), CHANGED INFORMATION SUCH AS ATTRIBUTE (0D–0F)

FIG.10

| 00 | | 07 | 08 | | 0A | 0B | 0C | 0D | 0E | 0F |
|---|---|---|---|---|---|---|---|---|---|---|
| NEW FILE NAME | | | NEW EXTENSION | | | FILE NUMBER | | THE OTHER CHANGE | | |

ATTRIBUTE

OPTICAL CARD HAVING REGISTERED REGION FOR DIRECTORY MODIFIED INFORMATION AND FILE MANAGEMENT METHOD FOR OPTICAL CARD

This is a division of application Ser. No. 07/792,556, filed Nov. 15, 1991

BACKGROUND OF THE INVENTION

1. Field of the Invention

The present invention relates to an optical card having a registered region for directory modified information, and a file management method for the optical card.

2. Statement of the Related Art

Recently, an optical disk and an optical card have been widespread as optical information recording media. In these optical information recording media, information is transferred between an application program and these media by a BIOS (basic input and output system) which functions as a part of an OS (operating system) of a microcomputer.

Generally, files are managed by a directory consisting of file groups for managing files in which information, such as a sector number, has been written. That is, a directory information registered region is provided in a recording medium. In this region, directory information including a file name, a file length and a sector number of the first data is stored. Therefore, a file is effectively managed and easily accessed. Especially, the memory capacity in an optical recording medium is relatively large and many files can be stored, so that the file management by the directory becomes important.

Since former optical cards frequently use write-once-media and place a restriction on writing, various methods of managing files by using a directory have been considered. For example, where a whole system contains rewritable media, such as a hard disk, a method of storing directory information of an optical card (abbreviated as directory information, hereinafter) on the media is considered.

However, an optical card has excellent portability and can be used for an unspecified plurality of systems. Accordingly, directory information has not been recorded on the media to be used. In this case, the directory information is kept in a floppy disk as rewritable and portable media. Thus, it is necessary to carry both the optical card of former type and this floppy disk, so that this optical card is not practical.

Figure 1:
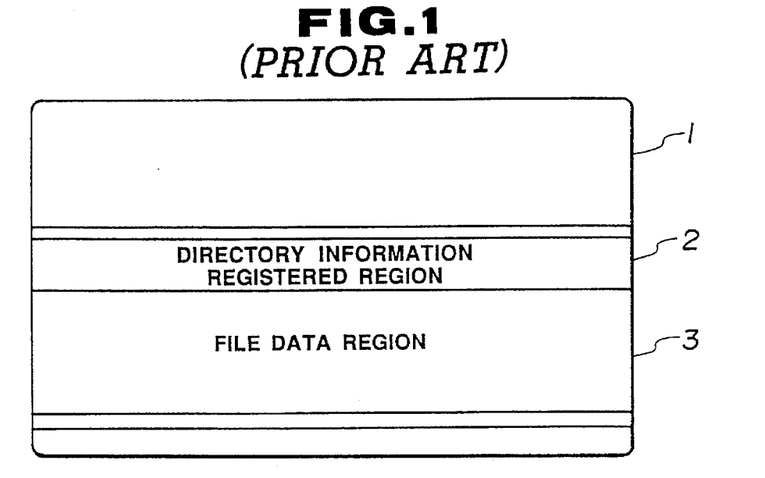
FIG. 1 is an explanatory view showing an optical card of a prior art example.

Also, a directory information registered region can be provided on the media. FIG. 1 is an explanatory view showing an optical card of a prior art example. A directory information registered region 2 and file data region 3 are provided on an optical card 1. Each file data is recorded in the file data region 3. The directory information registered region 2 is formed as an original form of the media which is different from the form of the directory management by using an OS of a microcomputer (not illustrated) which controls input and output of data.

Generally, a file under an OS is managed by directory information and file allocation information. The head position of a file is shown by the directory information and a linkage indicating the sector where this file is written in is shown by the file allocation information. However, in an optical card of a prior art example, the directory information including a file name, a file length and a sector number of the first track number is written in the directory information registered region 2 when a file is written in the file data region 3. Therefore, the file allocation information is not needed in the optical card and the directory information is written in the directory information registered region 2 which is differently formed from a file management form under an OS.

The OS has a program for copying a file, a program for writing the directory information in the directory information registered region 2 of an original form of the media and a program for displaying the directory information in the same way as the display of the directory by the OS.

The file is written in the optical card 1, for example, from a floppy disk to the file data region 3 by executing a file copy program in the OS. To the contrary, a file in the file data region 3 is copied in a floppy disk by executing the file copy program.

However, as mentioned above, since the form of the directory information registered region 2 is basically different from a file management form under the OS, for example, a function including opening/closing and reading/writing of a file by a function call of the OS, cannot be used. Accordingly, even if a file is read from the file data region 3, first of all, it is necessary to copy the file in a floppy disk by the copy program.

Further, a method for providing the directory information registered region on the former optical card by the OS can be considered. In this case, a file deleting command is not allowed and the region is always managed so as to add a file. Also, a modifying command of the directory information is not allowed.

However, not allowing the file deleting command is unduly restrictive. Also, a renaming function of a file cannot be used because a modifying command of the directory information is not allowed. In this case, a method of deleting a file by overwriting on the directory information can be also used. The overwriting is equal to deleting a subject file in view of the OS.

Nevertheless, since the directory information is overwritten, a position of the sector in which the subject file is recorded becomes unclear and the OS errs in its judgement in that the sector where the subject file is recorded is an empty data region. Thus, a new data might be written in this sector, and it becomes a problem in which an error is made when the data is written and in which changing sector process has frequently occurred.

In the Gazette of Japanese Patent Laid Open No. 690721/1988, an area which shows a deleted file in the head of a track number stored area of a file in a directory area is provided and when, this area, such as a (flag) bit is changed to "1", a file can be easily and logically deleted even in an additional writing type information recording medium. Thus, it is planned to make the same directory format for write-once-media as the format of a floppy disk in accordance with the file management form under an OS and to operate the format similarly. However, because the write-once-media is different from the floppy disk, for example, once a deleting file process, that is, a (flag) bit is changed to "1", the bit cannot be changed to "0" after that and, therefore, it is difficult to revive the deleted file. Also, once an attribute of a file is changed, the attribute cannot be changed after that. For example, if a file is adjusted to be an invisible state for a fixed period of time and desired to return to a visible state after the period, the file can be easily returned to a visible state in a rewritable floppy disk provided that the bit showing the attribute is changed, while it cannot be returned because it is write-once-media.

That is, it is considered that the file management form under the OS is suitably determined at first assuming as rewritable recording media.. Therefore, because similar directory format which is not rewritable recording media is not rewritable, a function of the format is limited to only once or the function itself is limited (actually prohibited). Thus, even if the write-once-media is adjusted to the directory format of rewritable media, it is necessary to judge whether to receive an using function or not after the used number of times in the past is examined depending on the function. Accordingly, it is the weak point that the file management becomes quite complicated.

Also, in the Gazette of Japanese Patent Laid Open No. 91888/1988, a directory forming method is disclosed. The method can logically delete an unnecessary file by recording deleting directory information which shows a deleted file in a directory area. By using this method, a host computer controls a file by deleting the directory shown as a deleted directory. Also, in this prior art example, once deleted directory information is recorded, it is difficult to logically revive the deleted file by the deleted directory information after that.

Also, in the above mentioned two gazettes, a weak point is that a file renaming function cannot be used.

OBJECT AND SUMMARY OF THE INVENTION

An object of the present invention is to provide an optical card having flexibility in which a deleted file can be logically revived and a file can be renamed, and to provide a file management method for the optical card.

Another object of the present invention is to provide an optical card which is suitable for making an OS fully function without increasing the occurrence of the sector changing process and to provide a file management method for the optical card.

The optical card of the present invention contains a directory information registered region in which file directory information is registered and a directory modified information registered region in which directory modified information for modifying the directory information was registered in this directory information registered region. Therefore, the optical card a structure in which directory information can be modified.

The characteristic of the file management method of the optical card in this invention is to register directory modified information showing the modified contents of directory information recorded on the optical card and to modify the directory modified information, to read the directory modified information when a file on the optical card is gained access to and to be able to modify the directory information by the read directory modified information so as to be the directory information for access processing.

In this invention, directory modified information for modifying directory information is registered in the directory modified information registered region. Thus, the modified contents can be registered on media without deleting the directory information and modified information can be obtained even if write-once-media is used.

In this invention, when the directory information is modified, the directory modified information showing modified contents is registered on the optical card. At the time of access to a file, registered directory information and directory modified information are read and the directory information is modified by the directory modified information, so that the modified information is utilized as the directory information for access process. Accordingly, even if the write-once-media is used, the directory information can be modified.

BRIEF DESCRIPTION OF THE DRAWINGS

FIGS. 2 to 11 relate to the first embodiment of this invention.

DETAILED DESCRIPTION OF THE PREFERRED EMBODIMENTS

The embodiment of the present invention will be explained by referring to the drawing as follows.

Figure 2:
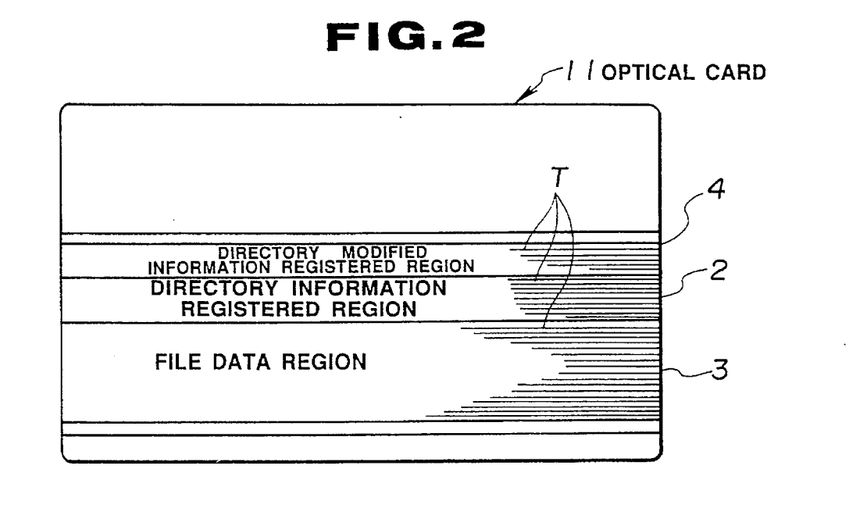
FIG. 2 is an explanatory view showing an optical card of the first embodiment.

As shown in FIG. 2, an optical card 11 of the first embodiment has rectangular shape (card shape) and a plurality of tracks T . . . T are linearly formed along the lengthwise direction of the rectangle. Each track T is divided into sectors (not illustrated). In every track T, the number of sectors (sectors/track) and the number of bytes in a sector (bytes/sector) can be appropriately recognized. A plurality of kinds of tracks can be formed, for example, 16 bytes/sector and 16 sectors/track, 32 bytes/sectors and 12 sectors/track, 64 bytes/sector and 8 sectors/track, 128 bytes/sectors and 5 sectors/track, 256 bytes/sectors and 3 sectors/track, or 1024 bytes/sector and 1 sector/track.

Also, as shown in FIG. 2, the optical card 11 has a directory modified information registered region 4 in addition to the directory information registered region 2 and the file data region 3. If it is considered that the directory information of the OS in a general personal computer is composed of about 32 bytes, a plurality of tracks, such as 32 bytes/sector and 12 sectors/track are allocated as the directory information registered region 2 of this optical card 11.

Figure 3:
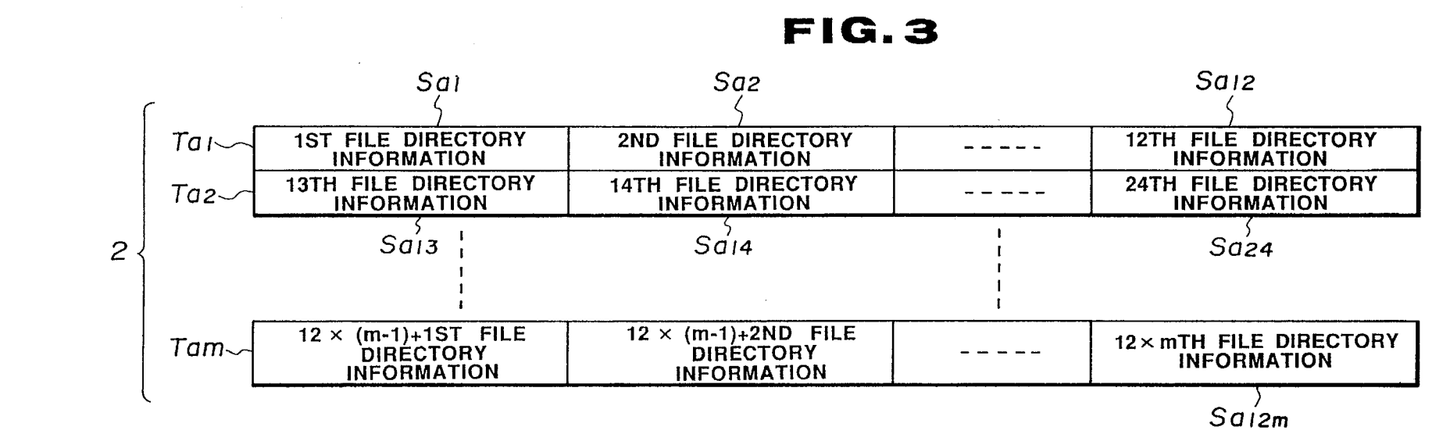
FIG. 3 is an explanatory view showing a format of a directory information registered region in FIG. 1.
Figure 4:
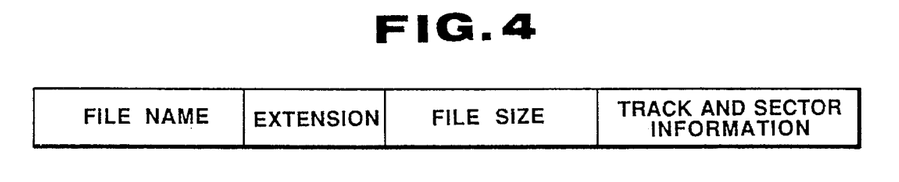
FIG. 4 is an explanatory view showing a format of directory modified information.

FIG. 3 shows an example in which a directory information registered region 2 consists of m tracks, Ta1, Ta2 . . . Tam. Each track has 12 sectors. File directory information registered in the first to 12 is stored in sectors Sa1, Sa2 . . . Sa12 in the track Ta1, respectively. Similarly, file directory information registered in the 13th to 12 mth is stored in sectors Sa13, Sa14 . . . Sa12m, respectively. For example, as shown in FIG. 4, directory information contains a file name, an extension, a file size and numbers of tracks and sectors in which the file is recorded in the registered order.

In a file data region 3, each track, such as 64 bytes/sector and 8 sectors/track, 128 bytes/sector and 5 sectors/track, 256 bytes/sector and 3 sectors/track and 1024 bytes/sector and 1 sector/track is allocated depending on the size of the information that the system processes.

Figure 5:
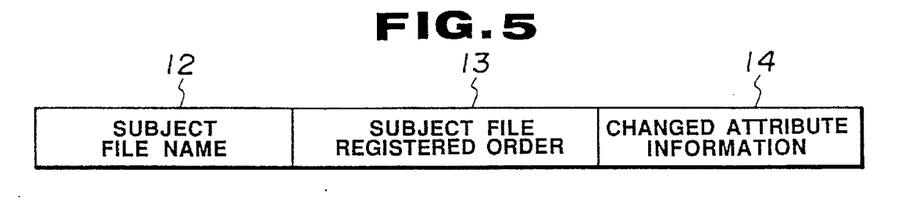
FIG. 5 is an explanatory view showing a format of directory information.

In a directory modified information registered region 4, as shown in FIG. 5, the modified contents, that is, directory modified information including a subject file (in which directory information is modified) name 12, a subject file registered order 13 and changed attribute information 14 is stored. Also, as a directory modified information registered region 4, a plurality of tracks of 16 bytes/sector and 16 sectors/track are allocated.

Figure 6:
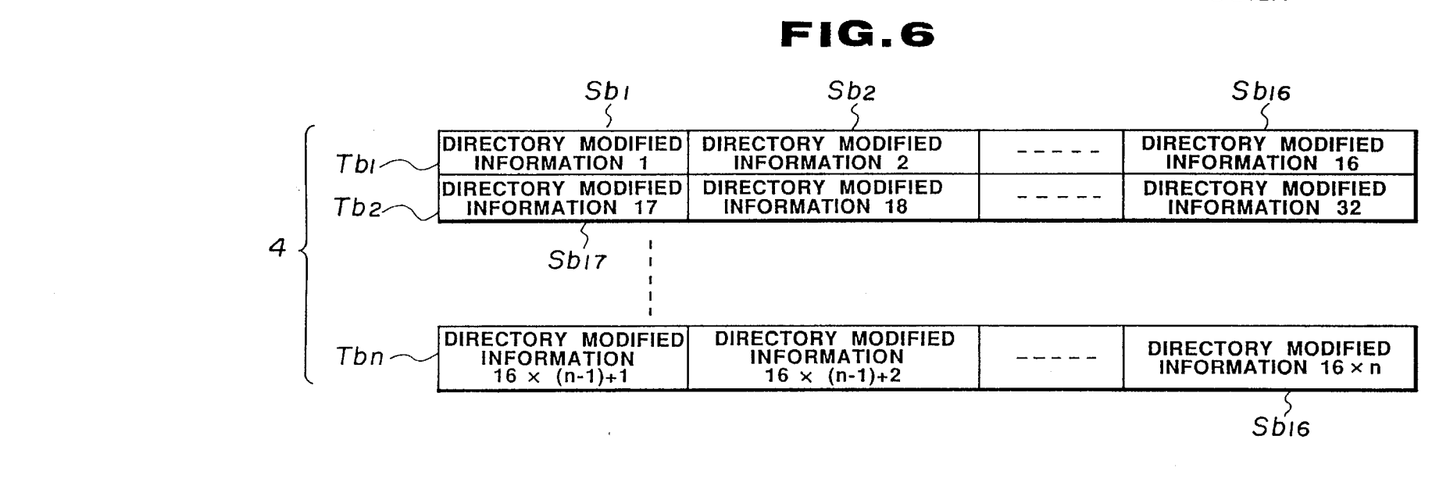
FIG. 6 is an explanatory view showing a format of a directory modified information registered region in FIG. 1.

FIG. 6 shows an example in which the directory modified information registered region 4 consists of n tracks, Tb1, Tb2 . . . Tbn. The first to 16th directory modified information can be stored in 16 sectors, Sb1 to Sb16 forming the track Tb1, respectively. Similarly, the 17th to (16×n)th directory modified information can be stored in sectors Sb17 to Sb16th in tracks Tb2 to Tbn, respectively.

Figure 7:
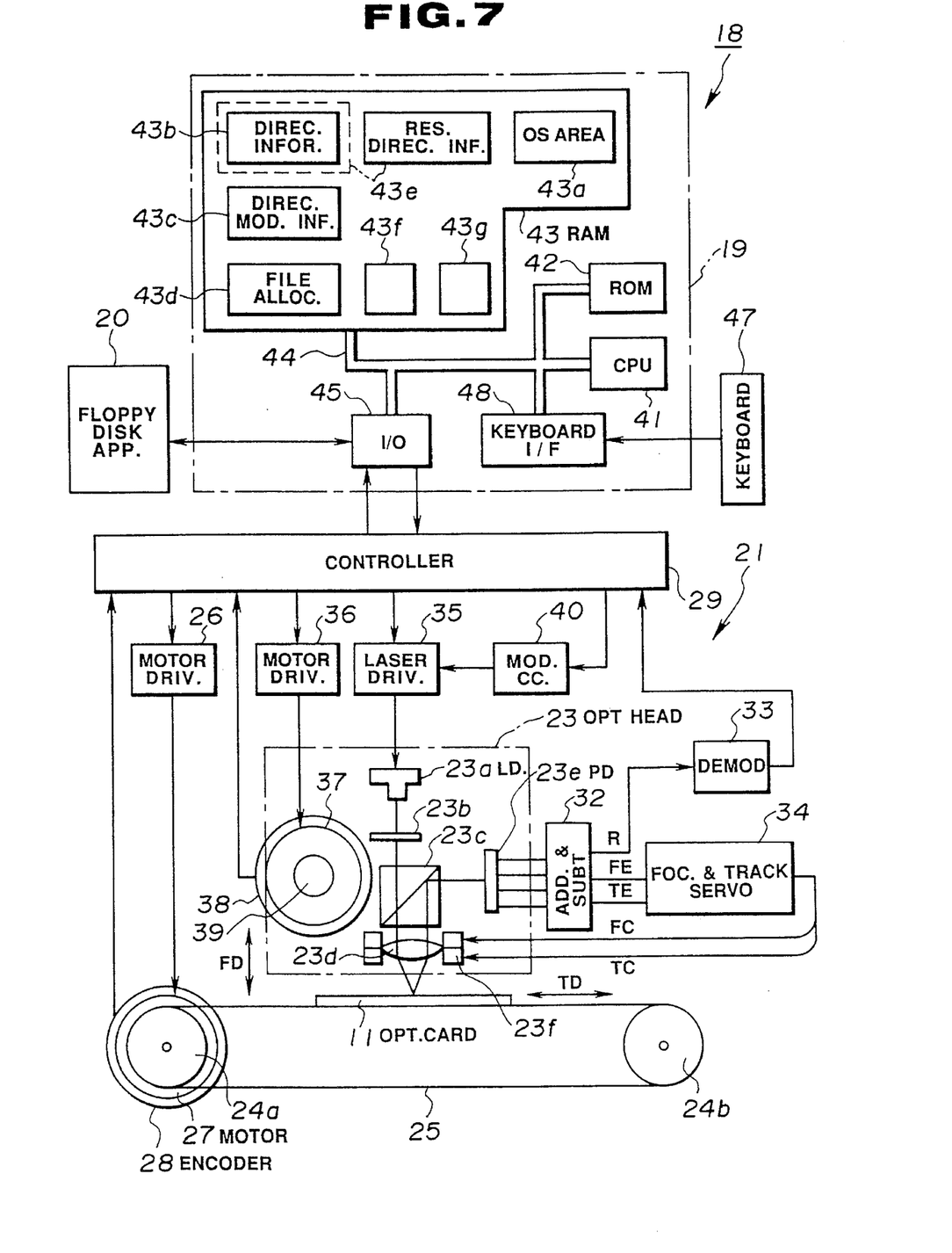
FIG. 7 is a block diagram showing an outline of structure of a personal computer system.

FIG. 7 shows the outline structure of main part of a personal computer system 18 which relates to the first embodiment. In FIG. 7, the system 18 is formed of a personal computer 19, an optical card recording/reading apparatus 21 which is used under the OS of the personal computer 19 and, for example, a floppy disk apparatus 20 in which information of the OS program or the like is stored.

In FIG. 7, the optical card recording/reading apparatus 21 records and regenerates data by moving the optical card 11 in the track direction and moving an optical head 23 at right angles to the track. The optical card 11 is attached to a predetermined position of a carrying belt 25 stretching between pulleys 24a and 24b. The carrying belt 25 carries the optical card 11 back and forth in the track direction TD of the optical card by driving a motor 27. The drive of the motor 27 is controlled by a motor driving circuit 26.

An encoder 28 for detecting the position of the optical card 11 for the optical head 23 is fitted to the motor 27 and the output of the encoder is supplied to a controller 29.

The optical head 23 projects write or read light to the optical card 11 from a laser diode 23a through an optical system containing a diffraction grating 23b, a beam splitter 23c and an objective lens 23d and also leads the light reflected from the card 11 to a detector 23e through the objective lens 23d and the beam splitter 23c.

From the output of a detector 23e, an RF signal R, a focus error signal FE and a track signal TE are produced through an adding and subtracting circuit 32. The RF signal R is demodulated by entering a modulating and demodulating circuit 33 modulating and demodulating signals. The demodulated data is temporally stored in a buffer memory (not illustrated) in the controller 29.

The focus error signal FE and track signal TE are supplied to a focus and track servo circuit 34 and a focus control signal FC and a track control signal TC carrying out focus/track servo are produced. These control signals FC and TC are applied to a lens actuator 23f driving the optical lens 23d and are in control of the move of the objective lens 23d of the optical head 23 in the focus direction FD and track direction TD so as to make a beam spot projected on the optical card a focused condition at all times and to follow a track.

A demodulated data temporally stored in a buffer memory (not illustrated) in the above mentioned controller 29 is processed by correcting errors in an error correcting circuit (not illustrated), so that data read signal or track address information can be obtained.

When the controller 29 regenerates or records data, a desired sector in a desired track where data should be read or recorded is sought and the data is read or recorded. When the controller 29 seeks the sector, the controller 29 drives a head motor 37 through a motor driving circuit 36 and moves the optical head 23 in the direction being at right to the track direction TD (perpendicular direction to the sheet in FIG. 6). When moving, the controller 29 can move the optical head 23 in the vicinity of a subject track by receiving the output of an encoder 38 fitted to a rotary axis of the motor 37. Also, the head motor 37 rotates and drives a spiral screw 39. The optical head 23 fitted to the spiral screw 39 is moved in the lengthwise direction of the spiral screw 39, that is, in the crossing direction of the track.

In the case in which the subject sector of the subject track is gained access to, a low output reading light is supplied from the laser diode 23a through a laser driving circuit 35 when data is read and, at the same time, the drive of the motor driving circuit 26 is controlled. Thus, data is read in a desired sector of a desired track based on track address information demodulated in a demodulating circuit 33 and a sector detecting signal.

Also, in data recording, a high output writing light is supplied from the laser diode 23a through the laser driving circuit 35 after a desired sector in a desired track recording data is sought (gained access to). In this case, data to be recorded is a binary signal. The binary signal is modulated by a modulating circuit 40 and low output emitting light power and high output emitting light power are changed in pulses in accordance with "H" and "L" of the binary signal and, for example, a pit is formed at the high output emitting power and write-once-information (data) is stored in the sector of the pit.

When a data is recorded, the data is transferred to the light card recording/reading apparatus 21 from the personal computer 19 as a host side apparatus and supplied to the modulating circuit 40 through the controller 29. Also, a regenerated data in which errors are corrected in the demodulating circuit 33 by demodulation or the controller 29 is transferred to the personal computer 19 from the controller 29.

The personal computer 19 contains a CPU 41 controlling the whole system, a ROM 42 storing control program information of the CPU 41, a RAM 43 as a working area and information stored area of the CPU 41, a bus 44 connecting the CPU 41, the ROM 42 and the RAM 43 and becoming a data transferring path and an I/O port part 45 for transferring data to the controller 29 of the optical card storing reading apparatus 21 and the floppy disk apparatus 20.

When a power switch (not illustrated) of the personal computer 19 is on, the OS information of the floppy disk apparatus 20 is read by the program of the ROM 42 and stored in an OS (information is stored) area 43a of the RAM 43, so that the personal computer is adjusted to be operable under the OS based on the OS information stored in the OS area 43a.

In the operable state, a data can be recorded/read by using the optical card recording/reading apparatus 21. In this case, before a recording/reading operation is performed in the optical card recording/reading apparatus 21, the CPU 41 gains access to each of the directory information registered region 2 and the directory modified information registered region 4 of the optical card 11 and the data read from these registered regions 2 and 4 are transferred to a directory information stored area 43b and a directory modified information stored area 43c in the RAM 43, respectively.

Also, the CPU 41 amends the information of the directory information stored area 43b by using the information of the directory modified information stored area 43c, so that the resultant directory information is produced and stored in a resultant directory information stored area 43e. In the case in which the resultant directory information is produced, the resultant directory information stored area 43e is formed in the directory information stored area 43b when the information of the directory information stored area 43b is rewritten by the directory modified information. A dotted line in FIG. 7 represents the case in which the resultant directory information stored area 43e is produced in the directory information stored area 43b and a solid line represents the case in which the area 43e is produced in the directory information stored area 43b and the other areas.

Also, the CPU 41 produces file allocation information from the information of the resultant directory information stored area 43e and stores the file allocation information in the file allocation stored area 43d.

The CPU 41 has file (and directory) allocation information of a deleted file (and directory) on the OS by the directory modified information, for example, in a stored area 43f on the RAM 43 and when information is stored in the optical card 11, a track number and a sector number for recording the information are determined by referring to not only file allocation information in the file allocation information stored area 43d but also the file allocation information in the stored area 43f and orders given on the side of the optical card recording/regenerating apparatus 21.

Thus, a new file or directory is not overwritten on a deleted file or directory on the OS.

Further, the CPU 41 stores information regarding how much directory modified information is used in the directory modified information stored area 43c, for example, in a stored area 43g. Then, when file deleting or renaming is instructed, the directory modified information is recorded in an empty directory modified information registered region, next to the directory modified information registered region which is used as a last one.

Then, the CPU 41 controls the recording/regenerating operation by using the information of these resultant directory information stored area 43e and the file allocation information stored area 43c.

Also, when a user operates keys on a keyboard 47 and enters instructing information which instructs recording/regenerating a data, the instructing information is transferred to the CPU 41 through a keyboard interface 48. The CPU 41 controls the instructing operation corresponding to the instructing information.

Next, a file management method for the optical card 11 will be explained by the system 18 formed as mentioned above. In this embodiment, a file is managed by, for example, MS-DOS as an OS of the personal computer 19.

Figure 8:
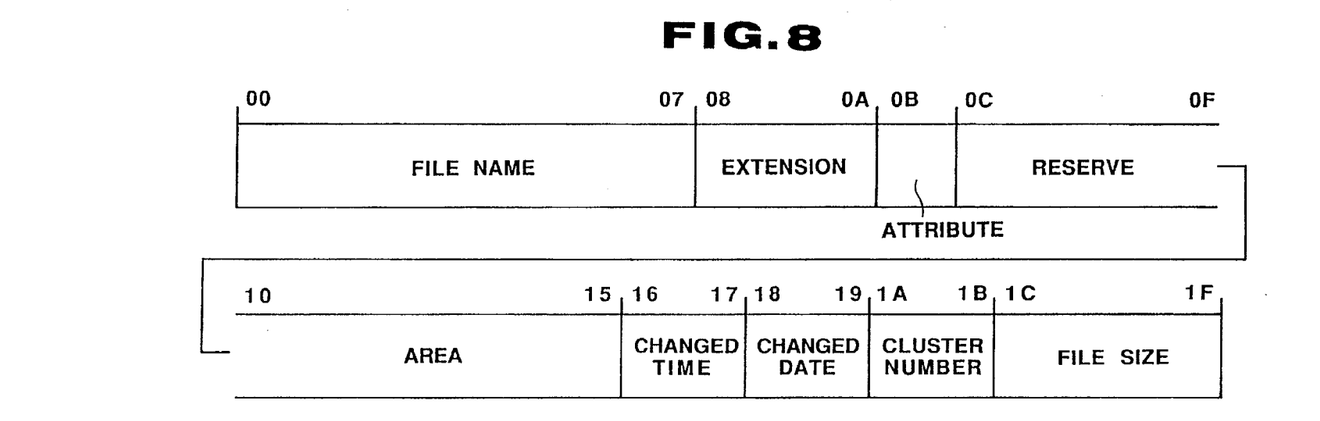
FIG. 8 is an explanatory view showing directory structure of MS -DOS.

The directory of this MS-DOS is formed as shown in FIG. 8. In FIG. 8, a bit of a byte showing an attribute has the following means.

$2^0$ bit: a file in which the bit is adjusted to 1 represents a "read only" file.

$2^1$ bit: a file in which the bit is adjusted to 1 represents an "invisible" file.

$2^2$ bit: a file in which the bit is adjusted to 1 represents a "system" file.

Figure 9:
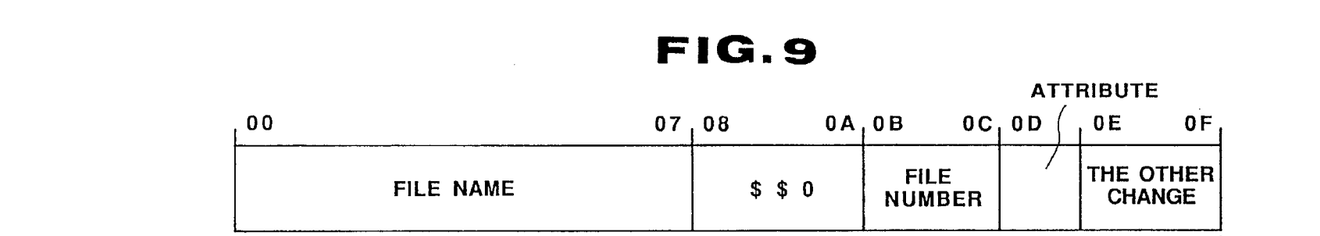
FIG. 9 is an explanatory view showing directory modified information registered in a directory modified information registered region under orders of deleting.

Accordingly, FIG. 9 shows an example of the information registered in "modified information registered region 4" when a file is required to delete. The extension of the file is, for example, $ $ 0, and the information including a file number (number of the subject file registered order) representing what the file order is and an "invisible attribute" is added.

Since the "invisible attribute" is added, $2^1$ bit in the "attribute" is adjusted to 1.

As a concrete example, a file in which directory information is stored in the sector Sa14 (the 14th registered file) require deletion. In this case, the OS catches the order of the sector storing the directory information of a subject file, that is, a file registered order by examining the directory information registered region 2 and a file name, registered order (14th) and the directory modified information containing an invisible attribute is recorded in the first sector (e.g. sector Sb17) of the empty region of the directory modified information registered region 4. Also, in this case, a special extension (e.g. $ $ 0) is added to a file name to be recorded in the directory modified information registered region 4.

In this point, the subject file to be deleted is read. The OS examines the directory information registered region 2 and the directory information of the subject file is read from the sector Sa14. Also, the OS examines the sector having the 14th data of file registered order from the directory modified information registered region 4. Thus, the directory modified information stored in the sector Sb17 is read. OS modifies the directory information of the subject file by using the directory modified information and the OS recognizes the modified information as the directory information of the subject file. As mentioned above, the attribute of this file is changed to an invisible attribute and the contents of the file directory information are not displayed. That is, this file is deleted in appearance.

Thus, the directory modified information registered region 4 is provided and when the directory information is modified, the directory modified information is written in the directory modified information registered region 4. When access to the modified file is gained, the directory information stored in the directory information registered region 2 is modified by the directory modified information read from the directory modified information registered region 4. To delete a file, an invisible attribute is provided as an attribute of the directory modified information, so that a file is deleted in appearance.

Figure 10:
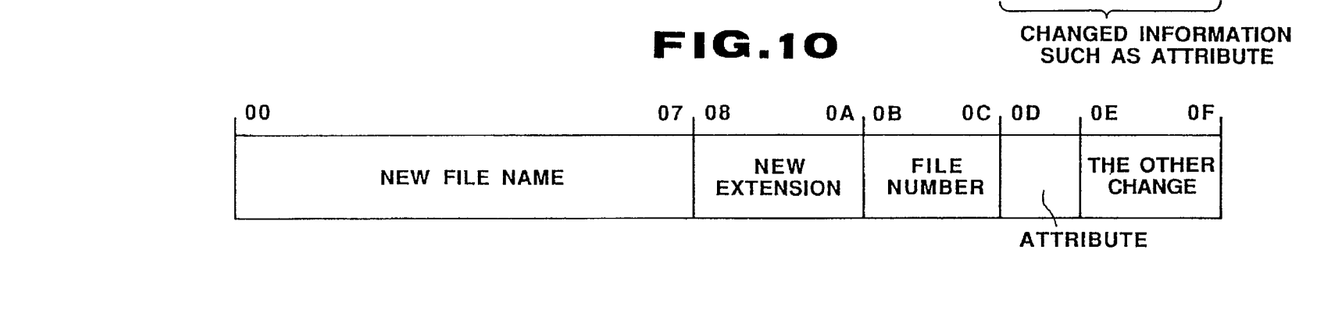
FIG. 10 is an explanatory view showing directory modified information registered in directory modified information registered region under orders of renaming.

Next, when a file requires renaming, FIG. 10 shows an example of the information registered in the "modified information registered region 4." A file name and file extension are used as a file name and extension to be desired to change and a file number showing the order of the file (the number of the subject file registered order) is added.

Also, if the attribute is not changed, the bit of "attribute" is the same as the former bit.

In this embodiment, when a directory is modified, the directory modified information to be modified is registered in the directory modified information registered region 4 in the sequential order. Therefore, a file which is deleted once can be revived and also a file name which is renamed by another name can be easily returned to the original name or further changed to another name.

For example, when there is only one deleted directory modified information (only directory modified information 1 (Sb1) in FIG. 6), in order to revive the file deleted by this directory modified information, the file is made to be the same file registered order in the next directory modified information 2 (Sb2) and the file name can be returned to the original file name. That is, in this embodiment, as long as recording space exists in the directory modified information registered region 4, the same directory information can be changed many times, so that a file can be managed flexibly.

Figure 11:
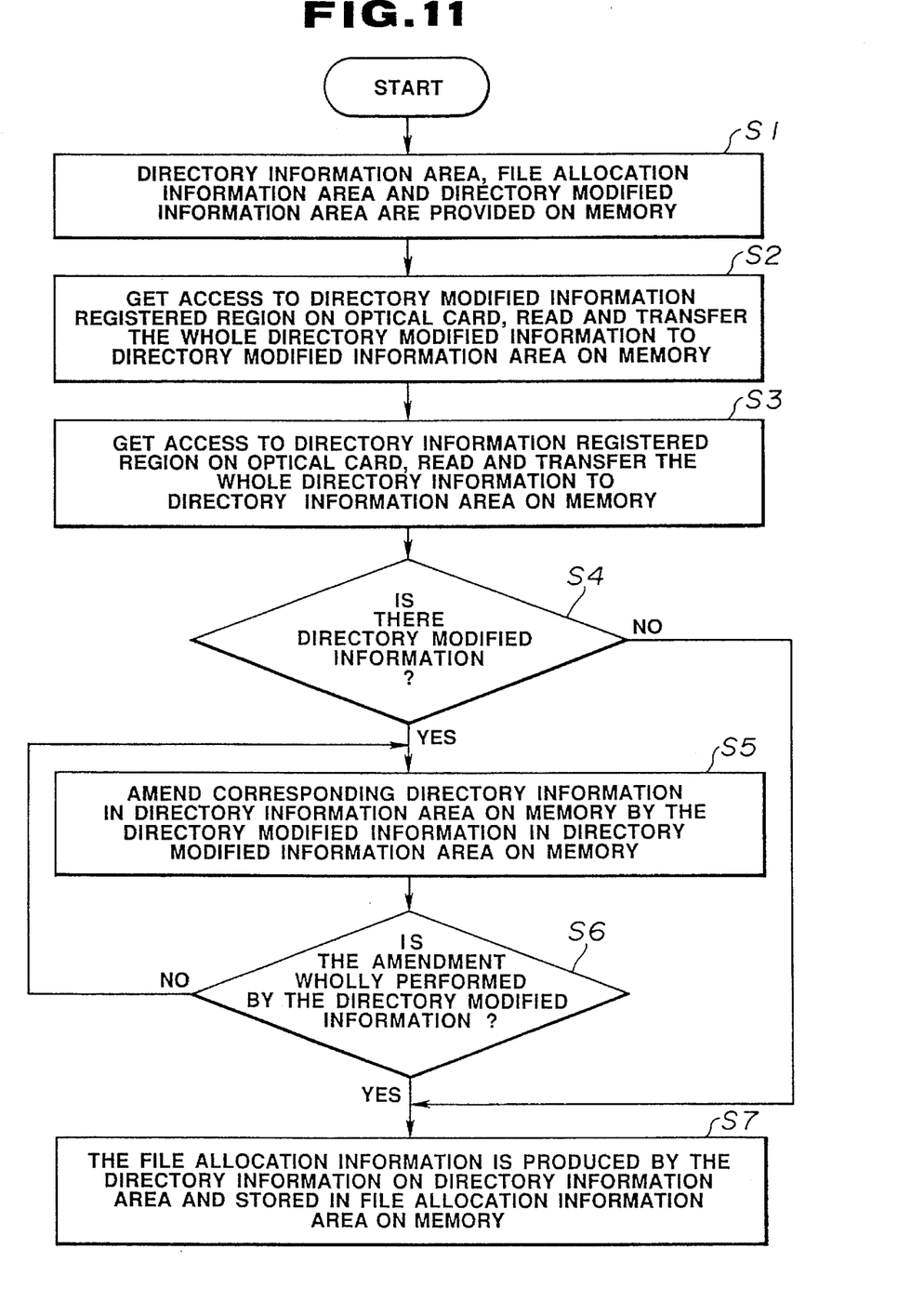
FIG. 11 is a flow chart showing a directory modifying process.

FIG. 11 shows a flow of an example of directory modification in this embodiment.

In step S1, a directory information area 43b, a file allocation information area 43d and a directory modified information area 43c are provided on the RAM 43 as a memory of the personal computer 19.

In the next step S2, the directory modified information registered region 4 of the optical card 11 is gained access to by the optical head 23 and the whole directory modified information recorded in the registered region 4 is read. Thus, the information is transferred to the directory modified information area 43c secured on the RAM 43 of the personal computer 19.

Similarly, in the next step S3, the directory information registered region 2 of the optical cared 11 is gained access to by the optical head 23 and the whole directory information recorded in the registered region 2 is read, so that the information is transferred to a directory information area 43b secured on the RAM 43 of the personal computer 19. Also, the order of the steps S2 and S3 can be reversed.

In the next step S4, the CPU 41 judges whether the directory modified information exists or not. When the CPU judges the existence of the directory modified information, the directory information corresponding to the directory modified information is amended by the directory modified information stored in the directory modified information area 43c. The amending process is performed for the whole directory modified information stored in the directory modified information area 43c.

For example, from the directory modified information 1 shown in FIG. 6 (although FIG. 6 is the information on the optical card 11, the information is transferred to the area 43c) to the last directory modified information (e.g. Sb16 in FIG. 6) stored in the area 43c in order.

For example, the directory information corresponding to a file in the registered order which is equal to the file registered order 13 of the directory modified information shown in FIG. 5. In this case, when a file name of directory information and the file name 12 of the directory modified information corresponding to the file name 12 do not coincide, the file name is changed to the file name 12 of the directory modified information, that is, the file name is renamed. Also, when a file name is deleted, for example, its attribute is changed to be invisible and at the same time, the extension is changed.

At step S6, the directory information of the optical card 11 is fixed without relating to whether the directory modified information exists or not and regarded as the resultant directory information. If the directory modified information does not exist, the directory information becomes the resultant directory information as it is.

Accordingly, the CPU 41 produces file allocation information, which is needed for the OS of the CPU 41, from the resultant directory information in step S7 and stored in a file allocation information area 43d. Also, the CPU 41 uses the resultant directory information as the directory information which the OS refers to.

In this method, the directory information and file allocation information are not deleted. Thus, it can be prevented that a new file is recorded in a sector in which a deleted file is recorded. Accordingly, the continuity of a file data region is maintained and occurrence of a sector changing process by a new file (excluding an inferior sector produced by overwriting) can be restricted to an inferior sector. Also, by this method, a file can be easily renamed. Further, even if a file is deleted, the file can be easily revived.

As mentioned above, overwriting can be effectively prevented by this invention. Thus, the invention has the effect in which the OS can fully function without increasing the occurrence of the sector changing process.

Also, different embodiments can be composed of the combinations of the parts of the above mentioned embodiment. These embodiments also belong to this invention.

What is claimed is:

1. A file management method of managing information registered in a file information recorded region in a plurality of tracks linearly formed in an optical card recording medium being able to read information by light beam irradiation and record said information in a write-once-medium as a file and managing said information by directory information named a file name, comprising the steps of:

reading directory information registered in a directory information registered region in said plurality of tracks and directory modified information for modifying said directory information registered in directory modified information registered region in said plurality of tracks;

modifying said directory information by said directory modified information only when directory modified information exists by said reading step and producing resultant directory information; and managing a file corresponding to said resultant directory information by way of said modifying step by using said resultant directory information as directory information of said file corresponding to said resultant directory information.

2. The method according to claim 1, wherein said directory information and directory modified information read by said reading step are temporally stored in a memory.

3. The method according to claim 2, wherein said directory information temporally stored in said memory is rewritten by said directory modified information temporally stored in said memory in said modifying step and said resultant directory information is produced.

4. The method according to claim 1, wherein information equal to registered order of said directory information is registered in said directory modified information registered region and changed information being different from said directory information is registered when said directory information registered in said directory information registered region in said optical recording medium is modified.

5. The method according to claim 4, wherein said changed information is at least one information of a file name or an attribute registered in said directory information registered region.

6. The method according to claim 1, wherein, when said directory modified information registered in said directory modified information registered region is deleting information for deleting recorded information in said file information recorded region, said directory modified information has storing means for storing information of a track recording said information corresponding to said deleting information and of a sector divided in said track.

7. The method according to claim 6, wherein said storing means is referred to preventing overwriting when information is recorded in said file information recorded region.

8. The method according to claim 1, wherein, when said directory modified information registered in said directory modified information registered region is deleting information for deleting information recorded in said file information recorded region, said directory modified information has storing means for storing information of a track recording said directory information corresponding to said directory deleting information and of a sector divided in said track.

9. The method according to claim 8, wherein said storing means is referred to preventing overwriting when directory information is registered in said directory information registered region.

* * * * *